US 9,306,797 B2

(12) United States Patent
Belling

(10) Patent No.: US 9,306,797 B2
(45) Date of Patent: Apr. 5, 2016

(54) FORKING INTERWORKING

(71) Applicant: NOKIA SIEMENS NETWORKS OY, Espoo (FI)

(72) Inventor: Thomas Belling, Erding (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 395 days.

(21) Appl. No.: 13/893,991

(22) Filed: May 14, 2013

(65) Prior Publication Data

US 2013/0304930 A1  Nov. 14, 2013

Related U.S. Application Data

(60) Provisional application No. 61/646,562, filed on May 14, 2012.

(51) Int. Cl.
*H04L 29/08* (2006.01)
*H04L 29/06* (2006.01)

(52) U.S. Cl.
CPC ...... *H04L 29/08576* (2013.01); *H04L 65/1006* (2013.01); *H04L 65/1069* (2013.01)

(58) Field of Classification Search
None
See application file for complete search history.

(56) References Cited

U.S. PATENT DOCUMENTS

2009/0238358 A1* 9/2009 Ramanathan et al. ... 379/221.03
2010/0054158 A1* 3/2010 Mathai ............... H04W 76/025
                                             370/259
2010/0165976 A1* 7/2010 Khan ................ H04M 3/42263
                                             370/352
2012/0158861 A1* 6/2012 Mosko ............... H04L 65/1096
                                             709/206
2012/0246326 A1* 9/2012 Singh et al. ............... 709/227

OTHER PUBLICATIONS

ETSI TS 129 209 V6.7.0 (Jun. 2007) "Universal Mobile Telecommunications System (UMTS); Policy control over Gq interface (3GPP TS 29.209 version 6.7.0 Release 6); ETSI TS 129 209"; IEEE, Lis, Sophia Antipolis Cedex, France; vol. 3-CN3; 3-CT3, No. V6.7.0; Jun. 1, 2007, XP014038178, p. 24, paragraph A.1-line bottom, paragraph A.1.2.
M. Handley et al: "SDP: Session Description Protocol"; Network Working Group; Request for Comments: 4566; pp. 1-49, Jul. 2006.
J. Rosenberg et al: "An Offer/Answer Model with the Session Description Protocol (SDP)"; Network Working Group; Request for Comments: 3264; pp. 1-25, Jun. 2002.
J. Rosenberg et al: "SIP: Session Initiation Protocol"; Network Working Group; Request for Comments: 3261; pp. 1-269; Jun. 2002.

(Continued)

Primary Examiner — Nicholas Taylor
Assistant Examiner — Clayton R Williams
(74) Attorney, Agent, or Firm — Squire Patton Boggs (US) LLP

(57) ABSTRACT

Communication systems, such as the long term evolution (LTE) of the third generation partnership project (3GPP), may interoperate with other communication systems. Interoperating communication systems may benefit from forking interworking in cases where, for example, one network supports session initiation protocol forking and one network does not. A method may include receiving a session initiation protocol invite request containing a session description protocol offer from a network not supporting forking. The method may also include receiving, in different early dialogs, a plurality of provisional session initiation protocol responses containing session description protocol answers. The method may further include storing information from the answers together with information about a related session information protocol dialog.

16 Claims, 3 Drawing Sheets

(56) References Cited

OTHER PUBLICATIONS

3GPP TS 23.231 V9.0.0 (Dec. 2009) "3rd Generation Partnership Project; Technical Specification Group Core Network and Terminals; SIP-I based circuit-switched core network; Stage 2 (Release 9)"; pp. 1-73; 3rd Generation Partnership Project (3GPP); Mobile Competence Centre; 650, Route des Lucioles; F-06921 Sophia-Antipolis Cedex; France.

3GPP TS 24.229 V9.11.1 (Apr. 2012) "3rd Generation Partnership Project; Technical Specification Group Core Network and Terminals; IP multimedia call control protocol based on Session Initiation Protocol (SIP) and Session Description Protocol (SDP); Stage 3 (Release 9)"; pp. 1-681; 3rd Generation Partnership Project (3GPP); Mobile Competence Centre; 650, Route des Lucioles; F-06921 Sophia-Antipolis Cedex; France.

3GPP TS 29.235 V9.7.0 (Mar. 2011) "3rd Generation Partnership Project; Technical Specification Group Core Network and Terminals; Interworking between SIP-I based circuit-switches core network and other networks (Release 9)"; pp. 1-104; 3rd Generation Partnership Project (3GPP); Mobile Competence Centre; 650, Route des Lucioles; F-06921 Sophia-Antipolis Cedex; France.

3GPP TS 23.228 V9.4.0 (Sep. 2010) "3rd Generation Partnership Project; Technical Specification Group Services and System Aspects; IP Multimedia Subsystem (IMS); Stage 2 (Release 9)"; pp. 1-253; 3rd Generation Partnership Project (3GPP); Mobile Competence Centre; 650, Route des Lucioles; F-06921 Sophia-Antipolis Cedex; France.

3GPP TS 29.231 V9.1.0 (Mar. 2010) "3rd Generation Partnership Project; Technical Specification Group Core Network and Terminals; Application of SIP-I Protocols to Circuit Switched (CS) Core Network Architecture; Stage 3 (Release 9)"; pp. 1-21; 3rd Generation Partnership Project (3GPP); Mobile Competence Centre; 650, Route des Lucioles; F-06921 Sophis-Antipolis Cedex; France.

3GPP TS 29.163 V9.9.0 (Mar. 2012) "3rd Generation Partnership Project; Technical Specification Group Core Network and Terminals; Interworking between the IP Multimedia (IM) Core Network (CN) subsystem and Circuit Switched (CS) networks (Release 9)"; pp. 1-306; 3rd Generation Partnership Project (3GPP); Mobile Competence Centre; 650, Route des Lucioles; F-06921 Sophia-Antipolis Cedex; France.

International Search Report and Written Opinion international application No. PCT/EP2013/064050 dated Sep. 25, 2013.

* cited by examiner

FORKING INTERWORKING

CROSS-REFERENCE TO RELATED APPLICATION

This application is related to and claims the priority of U.S. Provisional Patent Application No. 61/646,562 filed May 14, 2012, which is hereby incorporated herein by reference in its entirety.

BACKGROUND

1. Field

Communication systems, such as the long term evolution (LTE) of the third generation partnership project (3GPP), may interoperate with other communication systems. Interoperating communication systems may benefit from forking interworking in cases where, for example, one network supports session initiation protocol forking and one network does not.

2. Description of the Related Art

Session initiation protocol (SIP) forking is used in many networks. However, some networks do not support forking. As an example, the internet protocol (IP) multimedia subsystem (IMS) as described in 3GPP technical specification (TS) 23.228 and 3GPP TS 24.229 supports forking. By contrast, SIP with encapsulated integrated services digital network (ISDN) user part (ISUP) (SIP-I) based circuit switched core network (CS CN) discussed in 3GPP TS 23.231 and 3GPP TS 29.231 does not support forking.

To permit calls between networks that use forking and networks that do not support forking, appropriate signaling interworking procedures for the session initiation protocol (SIP), internet engineering task force (IETF) request for comments (RFC) 3261, and the session description protocol (SDP), IETF RFC 4566 and IETF RFC 3264, are required.

3GPP TS 29.235 describes procedures for interworking between the IMS and a SIP-I based CS CN performed by a media gateway control function (MGCF) as interworking unit. Some forking interworking related procedures are included, but those do not fully address SDP handling.

SUMMARY

According to certain embodiments, a method can include receiving a session initiation protocol invite request containing a session description protocol offer from a network not supporting forking. The method can also include receiving, in different early dialogues, a plurality of provisional session initiation protocol responses containing session description protocol answers. The method can further include storing information from the answers together with information about a related session information protocol dialogue.

A non-transitory computer-readable medium can, in certain embodiments, be encoded with instructions that, when executed in hardware, perform a process. The process can include receiving a session initiation protocol invite request containing a session description protocol offer from a network not supporting forking. The process can also include receiving, in different early dialogues, a plurality of provisional session initiation protocol responses containing session description protocol answers. The process can further include storing information from the answers together with information about a related session information protocol dialogue.

An apparatus, according to certain embodiments, can include at least one processor and at least one memory including computer program code. The at least one memory and the computer program code can be configured to, with the at least one processor, cause the apparatus at least to receive a session initiation protocol invite request containing a session description protocol offer from a network not supporting forking. The at least one memory and the computer program code can also be configured to, with the at least one processor, cause the apparatus at least to receive, in different early dialogues, a plurality of provisional session initiation protocol responses containing session description protocol answers. The at least one memory and the computer program code can further be configured to, with the at least one processor, cause the apparatus at least to store information from the answers together with information about a related session information protocol dialogue.

In certain embodiments, an apparatus can include means for receiving a session initiation protocol invite request containing a session description protocol offer from a network not supporting forking. The apparatus may further include means for receiving, in different early dialogues, a plurality of provisional session initiation protocol responses containing session description protocol answers. The apparatus can also include means for storing information from the answers together with information about a related session information protocol dialogue.

BRIEF DESCRIPTION OF THE DRAWINGS

For proper understanding of the invention, reference should be made to the accompanying drawings, wherein.

DETAILED DESCRIPTION

Figure 1:
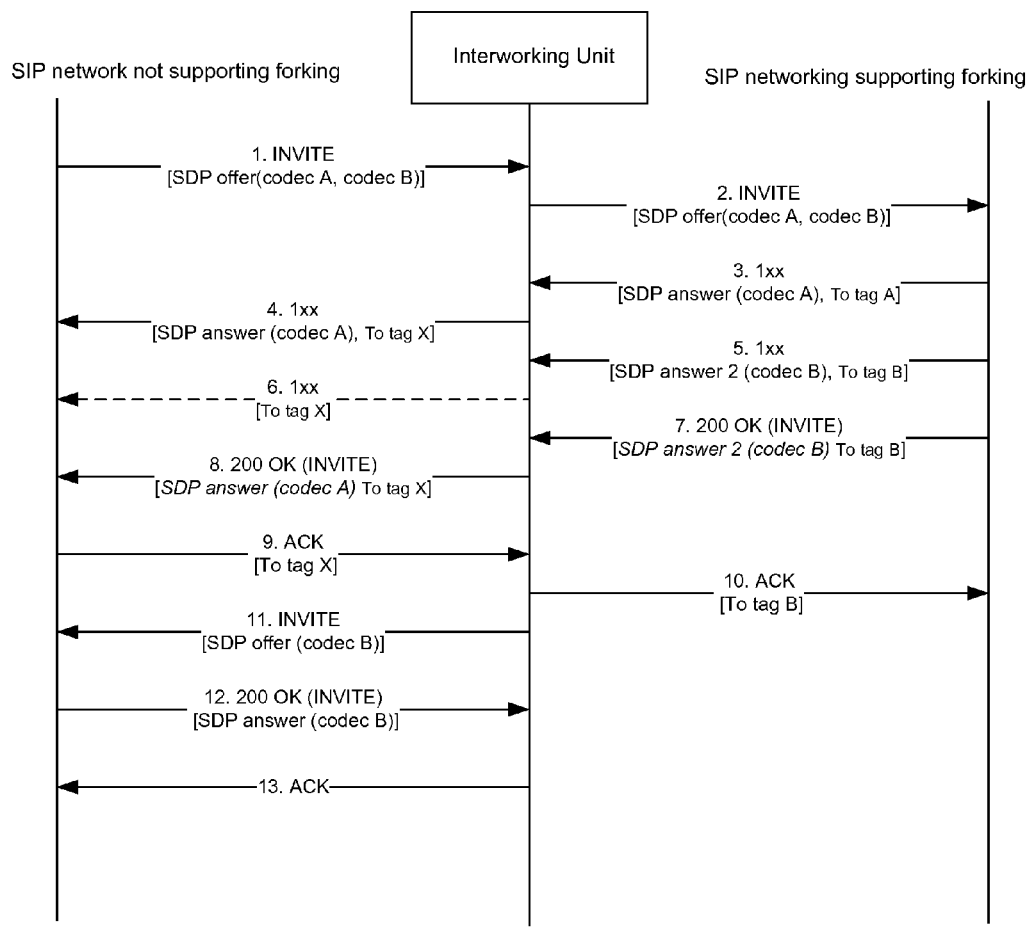
FIG. 1 illustrates a signaling flow according to certain embodiments.

Certain embodiments provide appropriate signaling interworking procedures to enable calls between networks that use forking and networks that do not support forking, appropriate signaling interworking procedures are required. When an interworking unit forwarding a SIP INVITE request receives multiple provisional SIP responses in different early dialogues all containing SDP answers, the interworking unit can store information from those SDP answers together with information about the early dialogue the SDP answers were received within.

The interworking unit can forward the first SDP answer it receives in a provisional response to the SIP networking not supporting forking and also can store information about this forwarded SDP answer. The interworking unit, however, can abstain from sending a subsequent SDP answer it receives in other provisional SIP responses to the SIP networking not supporting forking. Once the interworking unit receives the first 200 OK response to the INVITE request, the interwork unit can determine the SIP early dialogue to which the response relates and can compare the information about the forwarded SDP answer with information about the stored SDP answer for that early dialogue. If the information differs in relevant aspect(s), such as the contained codecs, the interworking unit can derive a new SDP offer from the information about the stored SDP answer for that early dialogue and can forward that SDP offer toward the SIP network that does not support forking.

Various SIP early dialogues can be used within the SIP network that does not support forking and the SIP network that does support forking. The interworking unit can stores applicable "To" SIP header field values for each SIP early dialogue and can replace the "To" header field values in received SIP messages with stored values for the SIP dialogue in which the interworking unit forwards the message. For the early dialogue relating to the INVITE request from the SIP network that does not support forking, the interworking unit can assign the "To" header field value itself. The interworking unit can extract the "To" header field from provisional responses received from the SIP networking supporting forking and can use them to identify the SIP early dialogues.

There may be only one dialogue within the network supporting SIP forking. Thus, forwarding multiple SDP answers in that dialogue with possibly different content to one SDP offer could create a SIP/SDP protocol error that could lead to a call establishment failure.

If the interworking unit receives a subsequent SDP answer in another SIP provisional response, the interworking unit may either forward the SIP provisional response, but remove the SDP answer from it, or it may not forward the SIP provisional response. The provisional responses can all contain relevant information to be interworked, for example, for "sequential" forking. The 3GPP TS 29.163 procedures, as used for constructing the ISUP bodies within SIP-I messages towards the SIP-I based CS CN, also may demand that ISUP messages are generated for each provisional response. On the other hand, signaling load can be reduced if SIP provisional responses without new information compared to the previous SIP provisional responses are not sent.

The interworking unit may contain or control a media interworking unit. For instance, the MGCF can control the IP multimedia media gateway (IM-MGW). In this case, the interworking unit modifies address information in the SDP offers and answers that the interworking unit forwards. Thus, the relevant SDP information for comparison may only be the media codec related information. Adjusting the codec information according to certain embodiments when a 200 OK (INVITE) is received by sending a new SDP offer can avoid any need for the media interworking unit to transcode media for the duration of the call. The absence of transcoding can improve speech quality for a telephony call and can reduce processing load at the media interworking unit. The media interworking unit can derive the SDP offer toward the SIP network that does not support forking from the stored SDP answer for the corresponding early dialogue by copying the codec related information, but providing address information from the media interworking unit.

If the interworking unit does not contain or control a media interworking unit, the relevant SDP information for comparison can also include IP address information. Adjusting the codec information according to certain embodiments when a 200 OK (INVITE) is received by sending a new SDP offer is necessary to allow any media in forward direction. The media interworking unit can derive the SDP offer towards the SIP network that does not support forking from the stored SDP answer for the corresponding early dialogue by copying the codec related information as well as address information.

The interworking unit can use, for example, a SIP INVITE or UPDATE request to send the new SDP offer towards the SIP network that does not support forking.

The interworking unit may also update the codec information towards the SIP network that does not support forking before it receives a 200 OK (INVITE) response by sending an SDP offer in an SIP UPDATE request after receiving a subsequent SDP answer in another SIP provisional response. This may be used, for example, in connection with sequential forking.

FIG. 1 illustrates a signaling flow according to certain embodiments. Other messages may be exchanged than those shown, with the shown messages serving to illustrate certain embodiments.

As shown in FIG. 1, an interworking unit, such as an MGCF, can be located at a boundary between a SIP network that does not support forking and a SIP network that does support forking. For example, the network that does not support forking may be a SIP-I based CS CN. The network that does support forking may be, for example, an IMS.

At 1, a SIP INVITE request can be received by the interworking unit from the SIP network that does not support forking. This INVITE can include an SDP offer with two codecs, codec A and codec B.

At 2, the interworking unit forwards the INVITE request towards a SIP network that does support forking.

At 3, the interworking unit receives a first SIP provisional response 1xx, such as "183 session progress" or "180 ringing," with a SIP "To" header field containing tag A, establishing a first SIP early dialogue. The message can contain SDP answer 1 with codec A. The interworking unit can stores information from SDP answer 1, such as codec A and address information. If the interworking unit controls a media interworking unit, for example, an IM-MGW, the interworking unit can configure the media interworking unit with information from SDP answer 1.

At 4, the interworking unit can forward the first SIP provisional response and can exchange the tag in the "To" header field with a locally assigned value X. The provisional response can include an SDP answer, for example, with the same codec A as received in a first answer. If the interworking unit controls a media interworking unit, the interworking unit can insert local address information of the media interworking unit into the SDP. Otherwise the interworking unit can forward the address information from the first SDP answer. The interworking unit stores information from the SDP such as codec and address information.

At 5, the interworking unit can receive a second SIP provisional response 1xx, such as "183 session progress" or "180 ringing," with a SIP "To" header field containing tag B, establishing a second SIP early dialogue. The message can include a second SDP answer with codec B. The interworking unit can store information from SDP answer 2 such as codec B and address information. If the interworking unit controls a media interworking unit, the interworking unit can configure the media interworking unit with information from SDP answer 2.

At 6, the interworking unit can forward the second SIP provisional response. Within the second SIP provisional response, the interworking unit exchanges the tag in the "To" header field with a locally assigned value X. If the SIP provisional response in message 4 was sent using the SIP "100rel" extension, the interworking unit does not need to include any SDP. If the SIP provisional response in message 4 was sent without using the SIP "100rel" extension, the interworking unit can include the same SDP answer as in message 4.

At 7, the interworking unit can receive a SIP 200 OK response within the second early dialogue, which can be identified by "tag B" in the SIP "To" header field). The second early dialogue thus becomes an established SIP dialogue. If the provisional response in message 5 was not using the SIP "100rel" extension, the SIP 200 OK response can contain the same SDP answer 2 as message 5. If the interworking unit controls a media interworking unit, and has not done so at 5, the interworking unit can configures the media interworking unit with information from SDP answer 2.

At 8, the interworking unit can forward the SIP 200 OK response and can exchange the tag in the "To" header field with the locally assigned value X. If the provisional response in message 4 was not using the SIP "100rel" extension, the interworking unit can include the same SDP answer as in message 4 to comply with SIP rules.

At 9, the interworking unit can receive a SIP ACK.

At 10, the interworking unit can send an SIP ACK within the second SIP dialogue, which can be identified by "tag B" in the SIP "To" header field.

At 11, the interworking unit can compare the stored SDP information for the established dialogue with the stored information about the SDP answer it has sent toward the SIP network that does not support forking from message 4. In this case, the established dialogue is the second early dialogue, for which the information was stored in message 5. If this information differs, the interworking unit can send a new SDP offer toward the SIP network that does not support forking and can include stored SDP information for the second early dialogue.

If the interworking unit controls a media interworking unit, the interworking unit can simply compare stored codec related information and include such stored codec information together with local address information from the media interworking unit in the new SDP offer. This can avoid a need for the media interworking unit to transcode media from that point onwards.

If the interworking unit does not control a media interworking unit, it can compare stored codec and address related information and can include such stored codec and address information in the new SDP offer. The interworking unit can send the new SDP offer in a SIP re-INVITE request, in this example, or a SIP UPDATE request towards the SIP network that does not support forking. This address information may be required to enable the transport of media in forward direction, with respect to the call setup direction.

At 12, the interworking unit can receive a 200 OK(INVITE) with the SDP answer for message 11. Then, at 13, the interworking unit can acknowledge this SDP answer.

Figure 2:
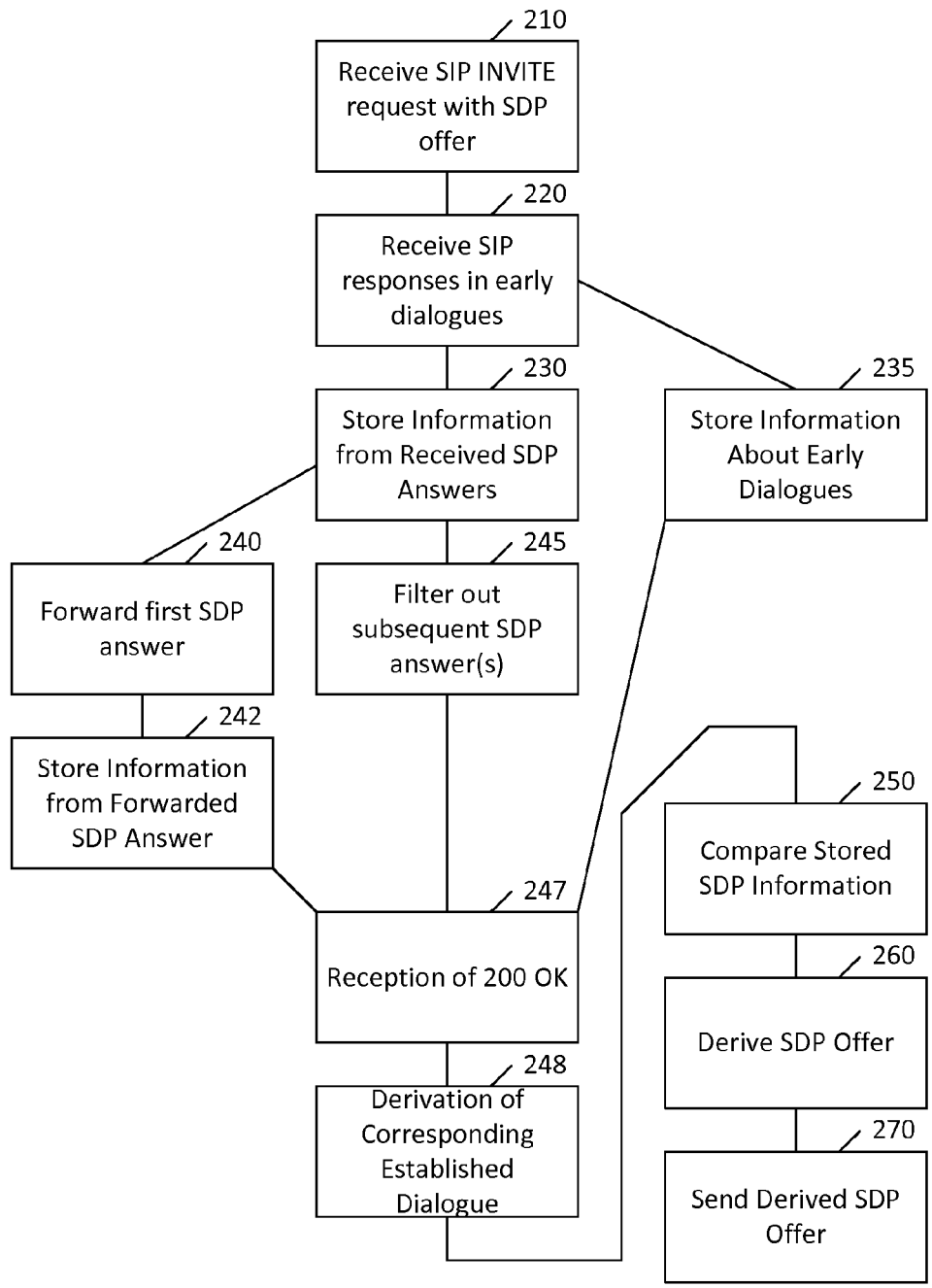
FIG. 2 illustrates a method according to certain embodiments.

FIG. 2 illustrates a method according to certain embodiments. The method of FIG. 2 may be performed by, for example, an MGCF. As shown in FIG. 2, a method can include, at 210, receiving a session initiation protocol invite request containing a session description protocol offer from a network not supporting forking. The method can also include, at 220, receiving, in different early dialogues, a plurality of provisional session initiation protocol responses containing session description protocol answers. The method can further include, at 230, storing information from the answers optionally together with information about a related session information protocol dialogue. The stored information can include the session description protocol codec information and/or address information. The method can also include, at 235, storing information about the early dialogues such as the session initiation protocol "to" header field values.

The method can further include, at 240, forwarding, to the network not supporting forking, a first session description protocol answer received in a provisional response to the session initiation protocol invite, and, at 242, storing information from the forwarded SDP answer. The method can additionally include, at 245, filtering out a subsequent session description protocol answer received in a subsequent provisional response to the session initiation protocol invite. Filtering out can simply be performed by not forwarding the subsequent SDP answers, unless they meet some predetermined criterion.

The method can also include, at 247, reception of a SIP "200 OK(INVITE)" response, and, at 248, derivation of corresponding established dialogue", for instance from the "To" header field value of the received SIP "200 OK(INVITE)" response.

The method can also include, at 250, comparing stored SDP information, including information of a forwarded SDP answer with information about a received SDP answer in an established dialogue.

The method can further include, at 260, deriving a session description protocol offer from the information stored from the answers.

The method can additionally include, at 270, sending the derived session description protocol offer to the network not supporting forking when a first session description protocol answer and a subsequent session description protocol answer differ from each other in a relevant aspect. The relevant aspect can be, for example, a contained codec.

Figure 3:
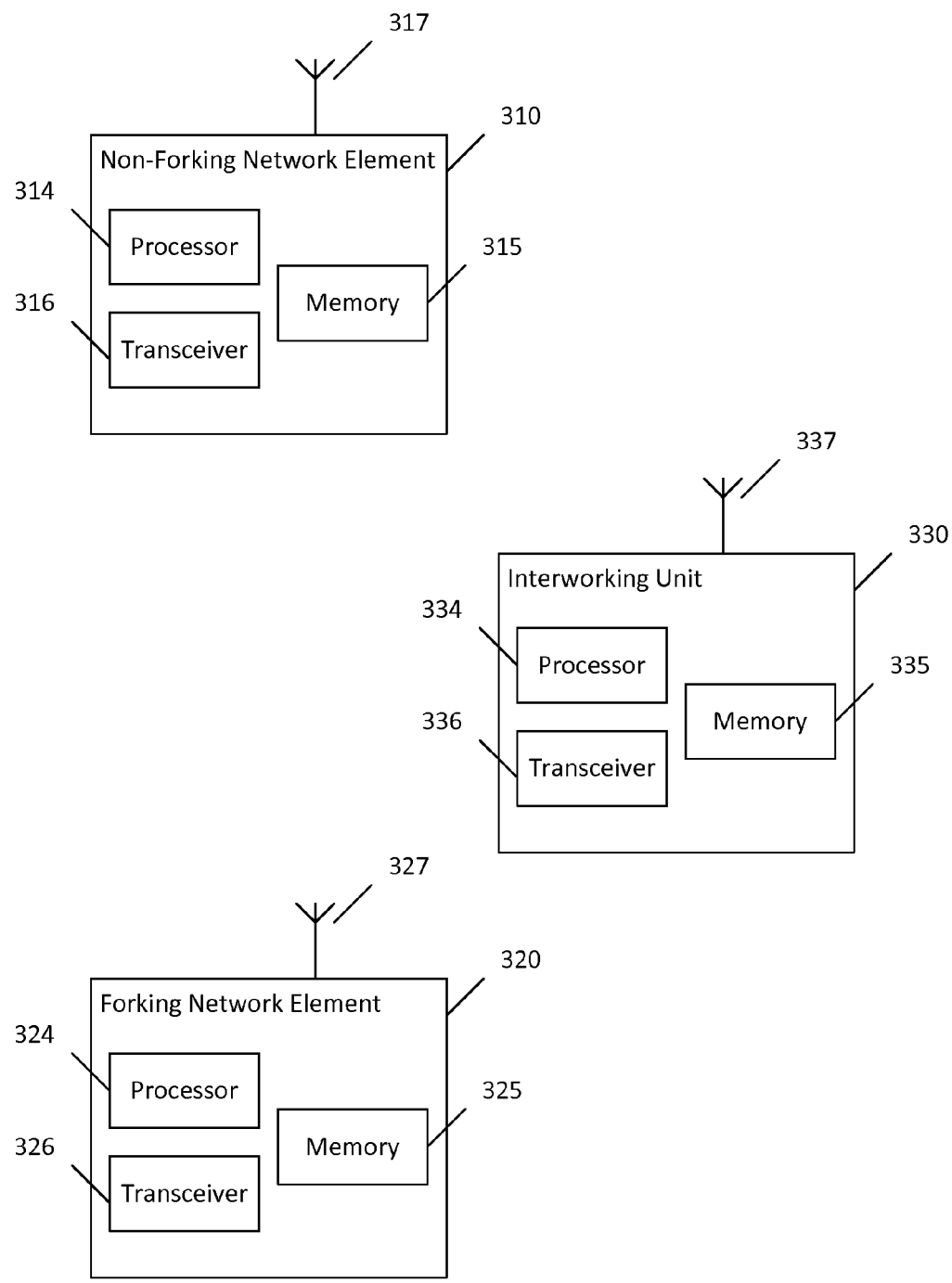
FIG. 3 illustrates a system according to certain embodiments.

FIG. 3 illustrates a system according to certain embodiments of the invention. In one embodiment, a system may include several devices, such as, for example, non-forking network element 310, forking network element 320, and interworking unit 330. Each of these devices may include at least one processor, respectively indicated as 314, 324, and 334. At least one memory is provided in each device, and indicated as 315, 325, and 335, respectively. The memory may include computer program instructions or computer code contained therein. Transceivers 316, 326, and 336 are provided, and each device may also include an antenna, respectively illustrated as 317, 327, and 337. Other configurations of these devices, for example, may be provided. For example, non-forking network element 310, forking network element 320, and interworking unit 330 may be configured for wired communication, rather than wireless communication, and in such a case antennas 317, 327, and 337 would illustrate any form of communication hardware, without requiring a conventional antenna.

Transceivers 316, 326, and 336 can each, independently, be a transmitter, a receiver, or both a transmitter and a receiver, or a unit or device that is configured both for transmission and reception.

Processors 314, 324, and 334 can be embodied by any computational or data processing device, such as a central processing unit (CPU), application specific integrated circuit (ASIC), or comparable device. The processors can be implemented as a single controller, or a plurality of controllers or processors.

Memories 315, 325, and 335 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate therefrom. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as non-forking network element 310, forking network element 320, and interworking unit 330, to perform any of the processes described above (see, for example, FIGS. 1 and 2). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 3 illustrates a system including a non-forking network element 310, forking network element 320, and interworking unit 330, embodiments of the invention may be applicable to other configurations, and configurations involving additional elements, as described herein.

According to certain embodiments, a method includes receiving a session initiation protocol invite request containing a session description protocol offer from a network not supporting forking. The method also includes receiving, in different early dialogues, a plurality of provisional session initiation protocol responses containing session description protocol answers. The method further includes storing information from the answers together with information about a related session information protocol dialogue.

The stored information can be information from the session description protocol codec information and/or address information and information from the session initiation protocol "to" header field values.

The method can further include forwarding, to the network not supporting forking, a first session description protocol answer received in a provisional response to the session initiation protocol invite and storing information related to the session description protocol answer.

The method can additionally include filtering out a subsequent session description protocol answer received in a subsequent provisional response to the session initiation protocol invite.

The method can also include receiving a 200 OK session initiation protocol response and determining the corresponding dialogue.

The method can also include comparing a stored information from the received session description protocol answer for that dialogue with the stored information for the forwarded session description protocol answer.

The method can further include deriving a session description protocol offer from the information stored from the answers.

The method can additionally include sending the derived session description protocol offer to the network not supporting forking when a first session description protocol answer and a subsequent session description protocol answer differ from each other in a relevant aspect.

The relevant aspect can be a contained codec.

A non-transitory computer-readable medium is, in certain embodiments, encoded with instructions that, when executed in hardware, perform a process. The process includes any of the preceding methods.

An apparatus, according to certain embodiments, can include at least one processor and at least one memory including computer program code. The at least one memory and the computer program code is configured to, with the at least one processor, cause the apparatus at least to receive a session initiation protocol invite request containing a session description protocol offer from a network not supporting forking. The at least one memory and the computer program code can also be configured to, with the at least one processor, cause the apparatus at least to receive, in different early dialogues, a plurality of provisional session initiation protocol responses containing session description protocol answers. The at least one memory and the computer program code can further be configured to, with the at least one processor, cause the apparatus at least to store information from the answers.

The stored information can be information from session initiation protocol "to" header field values.

The at least one memory and the computer program code can be configured to, with the at least one processor, cause the apparatus at least to store information about the early dialogues.

The at least one memory and the computer program code can be configured to, with the at least one processor, cause the apparatus at least to forward, to the network not supporting forking, a first session description protocol answer received in a provisional response to the session initiation protocol invite.

The at least one memory and the computer program code can be configured to, with the at least one processor, cause the apparatus at least to filter out a subsequent session description protocol answer received in a subsequent provisional response to the session initiation protocol invite.

The at least one memory and the computer program code can be configured to, with the at least one processor, cause the apparatus at least to compare a first session description protocol answer and a subsequent session description protocol answer.

The at least one memory and the computer program code can be configured to, with the at least one processor, cause the apparatus at least to derive a session description protocol offer from the information stored from the answers.

The at least one memory and the computer program code can be configured to, with the at least one processor, cause the apparatus at least to send the derived session description protocol offer to the network not supporting forking when a first session description protocol answer and a subsequent session description protocol answer differ from each other in a relevant aspect.

The relevant aspect can be a contained codec.

In certain embodiments, an apparatus includes receiving means for receiving a session initiation protocol invite request containing a session description protocol offer from a network not supporting forking and for receiving, in different early dialogues, a plurality of provisional session initiation protocol responses containing session description protocol answers. The apparatus also includes storing means for storing information from the answers.

The stored information can be information from session initiation protocol "to" header field values.

The apparatus can also include storing means for storing information about the early dialogues.

The apparatus can further include forwarding means for forwarding, to the network not supporting forking, a first session description protocol answer received in a provisional response to the session initiation protocol invite.

The apparatus can additionally include filtering means for filtering out a subsequent session description protocol answer received in a subsequent provisional response to the session initiation protocol invite.

The apparatus can also include comparing means for comparing a first session description protocol answer and a subsequent session description protocol answer.

The apparatus can further include deriving means for deriving a session description protocol offer from the information stored from the answers.

The apparatus can additionally include sending means for sending the derived session description protocol offer to the network not supporting forking when a first session description protocol answer and a subsequent session description protocol answer differ from each other in a relevant aspect.

The relevant aspect can be a contained codec.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

GLOSSARY

IP Multimedia Subsystem (IMS)
circuit switched core network (CS CN)
session initiation protocol (SIP)
Session Description Protocol (SDP)
media gateway control function (MGCF)

I claim:

1. A method comprising:
receiving a session initiation protocol invite request containing a session description protocol offer from a network not supporting forking;
receiving, in different early dialogues, a plurality of provisional session initiation protocol responses containing session description protocol answers;
storing information from the session description protocol answers together with information about session information protocol dialogues respectively related to the session description protocol answers;
deriving a session description protocol offer from at least a codec in the information stored from the session description protocol answers; and
sending the derived session description protocol offer to the network not supporting forking when a first session description protocol answer and a subsequent session description protocol answer differ from each other with respect to a relevant codec.

2. The method of claim 1, wherein the stored information comprises at least one of information from session description protocol codec information, or address information and information from the session initiation protocol "to" header field values.

3. The method of claim 1, further comprising:
forwarding, to the network not supporting forking, a first session description protocol answer received in a provisional response to the session initiation protocol invite; and
storing information related to the first session description protocol answer.

4. The method of claim 1, further comprising:
filtering out a subsequent session description protocol answer received in a subsequent provisional response to the session initiation protocol invite.

5. The method of claim 1, further comprising:
receiving a 200 OK session initiation protocol response; and
determining a corresponding dialogue.

6. The method of claim 5, further comprising:
comparing a stored information from the received session description protocol answer for the corresponding dialogue with the stored information for a forwarded session description protocol answer.

7. The method of claim 1, wherein the relevant aspect comprises a contained codec.

8. An apparatus, comprising:
at least one processor; and
at least one memory including computer program code,
wherein the at least one memory and the computer program code are configured to, with the at least one processor, cause the apparatus at least to
receive a session initiation protocol invite request containing a session description protocol offer from a network not supporting forking;
receive, in different early dialogues, a plurality of provisional session initiation protocol responses containing session description protocol answers;
store information from the session description protocol answers together with information about session information protocol dialogues respectively related to the answers;
derive a session description protocol offer from at least one codec in the information stored from the session description protocol answers; and
send the derived session description protocol offer to the network not supporting forking when a first session description protocol answer and a subsequent session description protocol answer differ from each other with respect to a relevant codec.

9. The apparatus of claim 8, wherein the stored information comprises at least one of information from session description protocol codec information, or address information and information from the session initiation protocol "to" header field values.

10. The apparatus of claim 8, wherein the at least one memory and the computer program code are configured to, with the at least one processor, cause the apparatus at least to
forward, to the network not supporting forking, a first session description protocol answer received in a provisional response to the session initiation protocol invite; and
store information related to the first session description protocol answer.

11. The apparatus of claim 8, wherein the at least one memory and the computer program code are configured to, with the at least one processor, cause the apparatus at least to filter out a subsequent session description protocol answer received in a subsequent provisional response to the session initiation protocol invite.

12. The apparatus of claim 8, wherein the at least one memory and the computer program code are configured to, with the at least one processor, cause the apparatus at least to receive a 200 OK session initiation protocol response; and
determine a corresponding dialogue.

13. The apparatus of claim 12, wherein the at least one memory and the computer program code are configured to, with the at least one processor, cause the apparatus at least to compare a stored information from the received session description protocol answer for the corresponding dialogue with the stored information for a forwarded session description protocol answer.

14. The apparatus of claim 8, wherein the relevant aspect comprises a contained codec.

15. A non-transitory computer-readable medium encoded with instructions that, when executed in hardware, perform a process, the process comprising:
receiving a session initiation protocol invite request containing a session description protocol offer from a network not supporting forking;
receiving, in different early dialogues, a plurality of provisional session initiation protocol responses containing session description protocol answers;

storing information from the session description protocol answers together with information about session information protocol dialogues respectively related to the session description protocol answers;

deriving a session description protocol offer from at least a codec in the information stored from the session description protocol answers; and sending the derived session description protocol offer to the network not supporting forking when a first session description protocol answer and a subsequent session description protocol answer differ from each other with respect to a relevant codec.

16. The non-transitory computer-readable medium of claim 15, the process further comprising:

forwarding, to the network not supporting forking, a first session description protocol answer received in a provisional response to the session initiation protocol invite; and storing information related to the first session description protocol answer.

* * * * *